United States Patent [19]

Lamkewitz

[11] 4,411,385

[45] Oct. 25, 1983

[54] CONTROLLER FOR THE OPERATION OF HEATERS

[75] Inventor: Falk Lamkewitz, Munich, Fed. Rep. of Germany

[73] Assignee: Webasto-Werk W. Baier GmbH & Co., Munich, Fed. Rep. of Germany

[21] Appl. No.: 294,228

[22] Filed: Aug. 19, 1981

[30] Foreign Application Priority Data

Aug. 20, 1980 [DE] Fed. Rep. of Germany ....... 3031410

[51] Int. Cl.³ .......................................... G05D 23/00
[52] U.S. Cl. .................................... 237/2 A; 431/18; 236/DIG. 8; 236/91 B; 237/12.3 C
[58] Field of Search .................... 431/18, 15; 165/22, 165/13, 41; 364/424, 400, 431; 236/91 D, 91 E, DIG. 8, 91 B; 237/2 A, 2 R, 12.3 A, 12.3 B, 12.3 C

[56] References Cited

U.S. PATENT DOCUMENTS 3,999,933 12/1976 Murphy .............................. 431/18
4,217,646 8/1980 Caltagirone et al. ................ 165/22

Primary Examiner—Albert J. Makay
Assistant Examiner—Henry Bennett
Attorney, Agent, or Firm—Antonelli, Terry & Wands

[57] ABSTRACT

In order to provide a controller which is readily adaptable for use with a plurality of different heaters, an arrangement is provided for storing a plurality of control and regulation programs for the operation of a plurality of different heaters. Based on selection instructions identifying a particular heater, an appropriate control and regulation program can be selected from among said plurality of programs. The controller then provides suitable control and regulation signals to said heater in accordance with the selected program.

16 Claims, 3 Drawing Figures

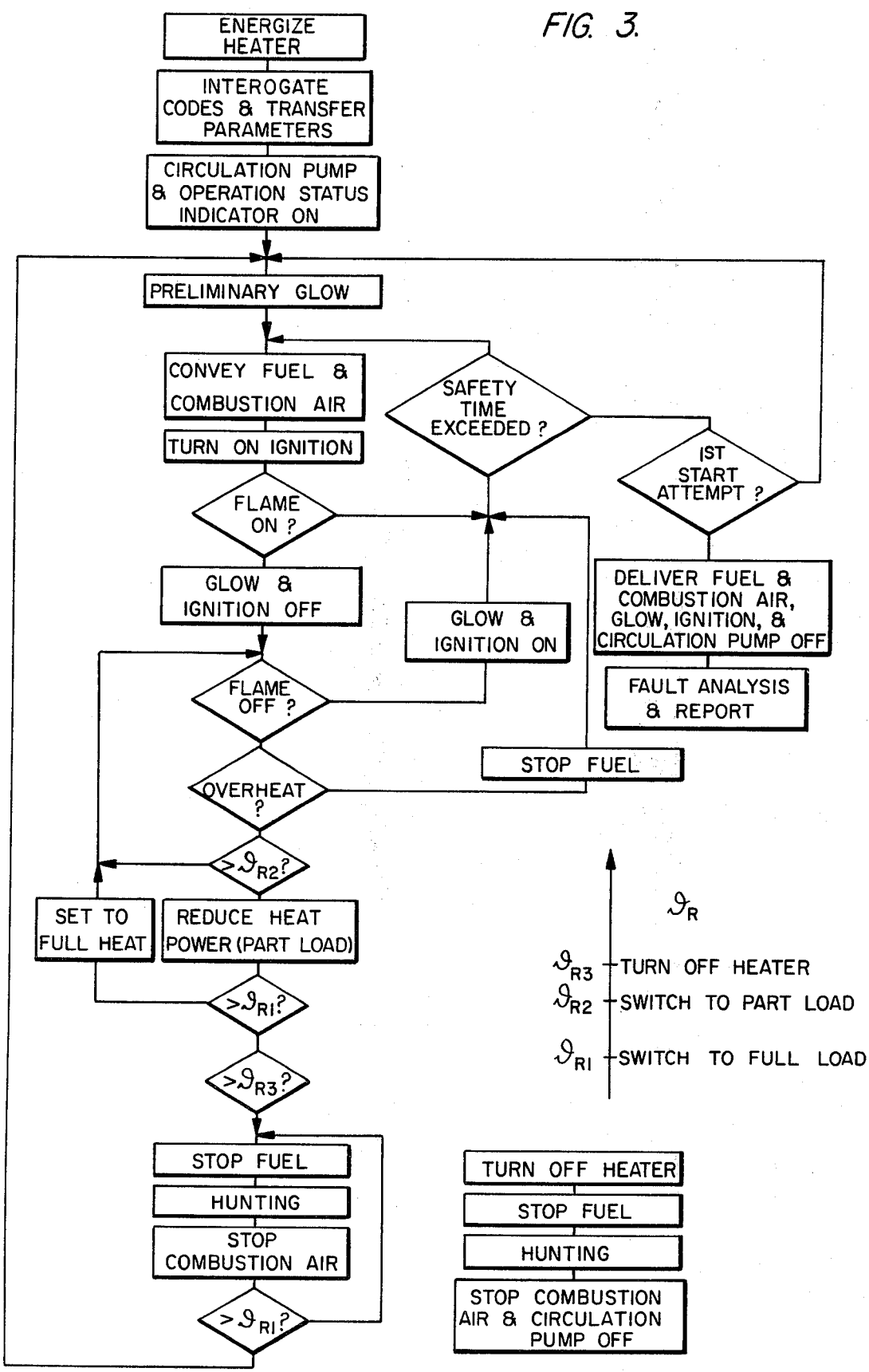

CONTROLLER FOR THE OPERATION OF HEATERS

FIELD OF THE INVENTION

The invention relates to a controller for the operation of heaters, and, more particularly, to a controller for vehicle heaters.

BACKGROUND OF THE INVENTION

To energize automotive heaters, for example, which operate through fuel combustion or electric heating, various controls are known in the art which are concerned with on/off timing and the level of heating power (as well as the distribution of the latter). A current type of heating control is an on/off control in which the heater is switched on when the temperature of the article to be heated lies under a set value, and is switched off when its temperature lies above the set value. It stands to reason that for different types and sizes of heaters, which take account of the terminal data, control facilities, etc. of the heaters concerned, different controllers are needed. This results in a wide variety of controllers, which makes it impossible to put the advantage of a large mass production to profitable use.

SUMMARY OF THE INVENTION

Accordingly, it is an object of the present invention to meet a great many different control requirements with a single controller.

To achieve this and other objects, a controller is provided which has a storage for various control and regulation programs and a setting capability for selecting one of the programs. The various programs take account of the requirements and facilities of the most varied heaters and also permit implementation of complex controls. Such a program storage can be provided at relatively low cost. When allocating the controller to a specific type of heater of a given size, the solicit request of the program in charge is fixedly programmed.

BRIEF DESCRIPTION OF THE DRAWINGS

Other objects and advantages of the invention will be apparent to those skilled in the art from the following description of one specific embodiment thereof, as illustrated in the accompanying drawing, in which:

FIG. 3 shows a simple flow diagram, as an example, of operation of the controller.

DETAILED DESCRIPTION OF THE PREFERRED EMBODIMENT

Figure 1:
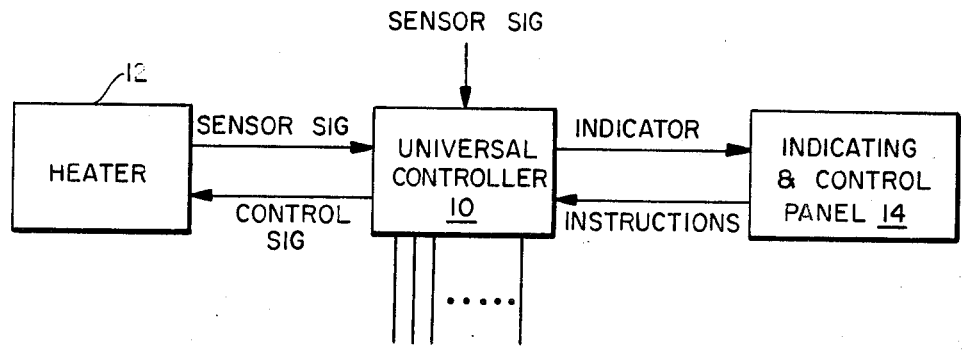
FIG. 1 is a block diagram to illustrate the installation of a controller embodying the invention in a heating system.

FIG. 1 shows the incorporation of the controller 10 into a heating system comprising a heater 12, the controller itself, and an indicating and control panel 14, as well as a plurality of sensors from the heater and external to the heater which report to the controller 10, in coded form, measured variables of interest. The panel 14 includes a main switch, operation indicator lamps, and a display with an adjusting key. During assembly, the type and size of the heater 12 to be connected are keyed into the controller 10 via a number of conductors, each of which corresponds to a binary digit, and this input continues to exist throughout the operation of the controller in conjunction with the heater. In this way, the controller 10 can be adapted to a large number of heaters.

Figure 2:
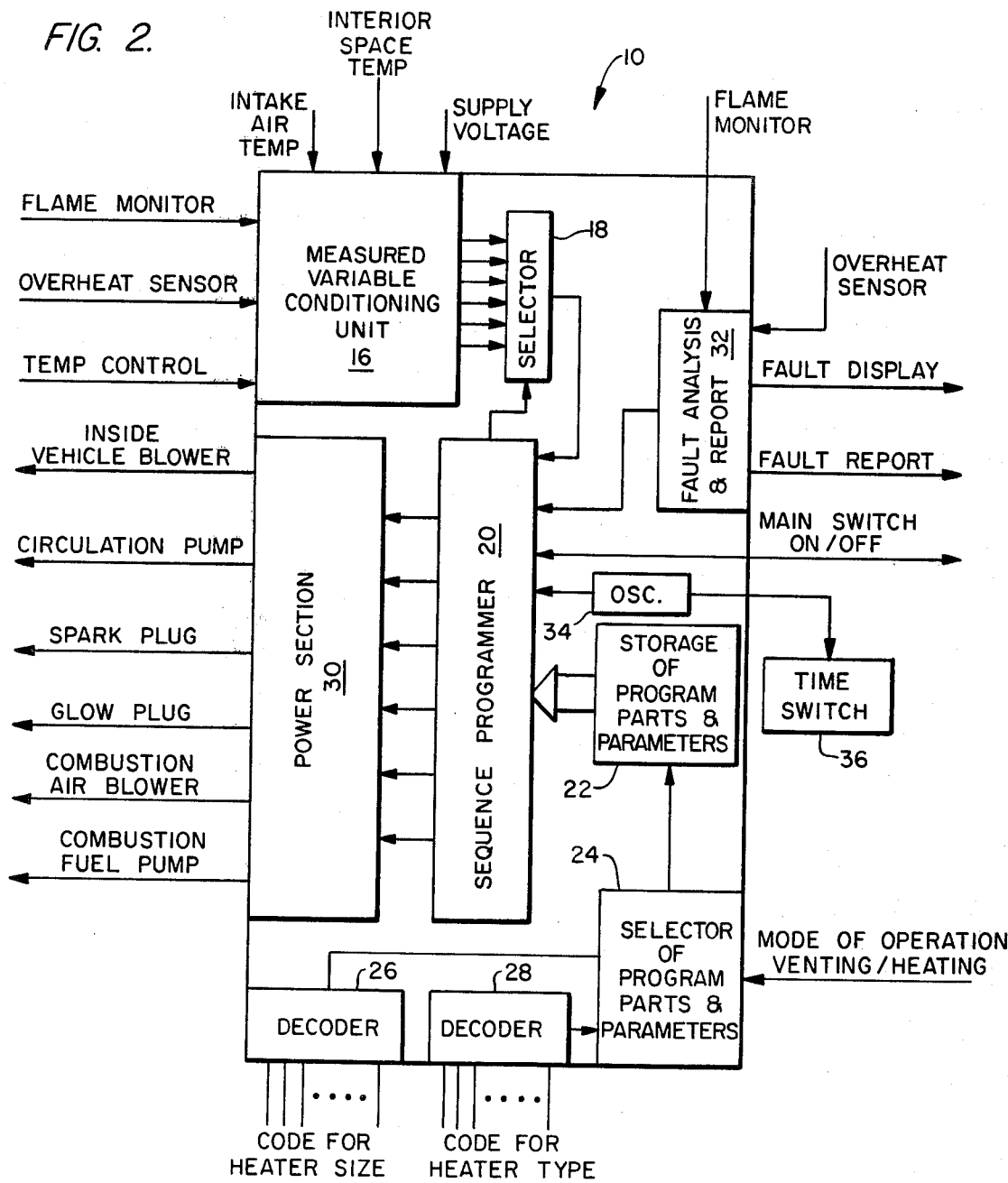
FIG. 2 is a block diagram of the controller.

FIG. 2 shows the basic configuration of a controller 10 embodying the invention, in which the external terminations shown in the drawing correspond to those of FIG. 1. In other words, on the left side the connecting cables are linked to the heater 12, while on the right side the connecting cables are linked to the indicating and control panel 14. On the upper side of the controller 10, connections are provided to the sensors located at various points outside the heater, and on the lower side the terminations are connected to means for the coding by hardwiring. As described above, during assembly a fixed coding is set for each particular heating unit so that the selection of the program parts and parameters in the storage is always the same in a given installation.

In more detail, the controller 10 comprises a measured variable conditioning unit 16 coupled to receive a flame monitor signal, an overheat sensor signal, and a temperature control signal from sensors in the heater 12 itself. Further, this measured variable conditioning unit 16 also receives an intake air temperature signal, an internal space temperature signal, and a supply voltage signal (sometimes referred to as board voltage) from sensors which are external to the heater 12. A primary function of the unit 16 is to check for proper operation of the sensors and to generate threshold values for the received values. In particular, the unit 16 provides for a short-circuit and interruption check of the flame detector and overheating sensor signalling conduits, as well as for two flame detector thresholds (one threshold indicating that the flame is burning while the other threshold indicating that the flame is not burning) and three control temperature thresholds such as indicated in FIG. 3.

Following conditioning in the unit 16, the signals are passed through a measuring variable selector 18 which selects the conditioned sensor signals in accordance with signals from a sequence programmer 20. These selected signals are then passed to the sequence programmer unit 20. The actual operation of the sequence programmer unit 20 is in accordance with the selected program parts and parameters stored in the unit 22 and selected by the selector 24.

The selector 24 is, in turn, controlled by decoded signals of the heater size and type fed from decoders 26 and 28, and from a signal from the indicating and control panel 14 indicating whether venting or heating is desired. The code signals for heater size and type are binary in form and permit selection of particular program parts and parameters from the storage 22 to accommodate different heaters in the manner mentioned above. In particular, the storage unit 22 contains program parts and parameters suitable for a variety of heaters. Depending on the particular code signals for heater size and type, the particular appropriate store program parts and parameters can be selected for the particular heater.

The output of the sequence programmer unit 20 is coupled to a power section 30 which provides output signals for the heater as illustrated in FIG. 2. Thus, control of the heater is attained for establishing proper heating in the manner described hereinafter.

In addition to the above-discussed elements, the sequence programmer unit 20 also receives a main switching on/off signal and a fault report signal from a fault analysis and report circuit 32. The fault analysis and report circuit 32 receives the output signals from a flame monitor sensor and an overheat sensor on the heater 12. These received values are checked by the fault analysis and report circuit 32 to determine if a fault exists in the flame or if overheating has occurred. The outputs of the unit 32 are display and status signals for indicating fault conditions. The unit 32 also provides a locking signal which is applied to the sequence programmer 20 to prevent restarting of the heating device without an external actuation (e.g. a short interruption of the supply voltage) if a fault has occurred. Flame extinction and overheating may, for example, be signalled by the unit 32 by switching off a lamp and by flashing this lamp, respectively.

Although the fault analysis and report circuit 32 has been indicated as separately receiving the flame monitor signal and the overheat sensor signal, it is to be understood that the unit 32 could be connected to receive these values after conditioning from the unit 16.

FIG. 3 shows a sequence flowchart such as can be implemented with the aid of the controller in accordance with the teachings of the invention by known programming techniques. As can be seen in FIG. 3, the operational steps for the heater are controlled in accordance with the state of the flame and the level of the control temperature. Thus, if the temperature exceeds $\theta_{R2}$ the heat is reduced by switching to a part load. On the other hand, if the temperature exceeds $\theta_{R3}$ the heater is turned off. It should be noted that although this flowchart of FIG. 3 and the controller of FIG. 2 have been set forth for a heater utilizing fuel combustion, it could readily be modified for an electric heater by appropriate monitoring of electrical coil conduction rather than flame level and fuel flow.

In the storage unit 22, in addition to the programs proper, the storage preferably includes other preselectable parameters, such as preliminary-flow time, safety time, hunting time, clock frequency of a fuel pump, different combustion-monitoring signals, various temperature thresholds for overheating condition and control operation, flow rate of fuel and air with part-load operation, etc. The selection of a program as a function of the type of heater also includes the selection of appropriate characteristic parameters, through the fixed solicit request by which the controller 10 is made the controller for a specified heater.

In a preferred embodiment, the programs are stored in the form of separate program parts which can variously be combined for different types of heaters, so that the storage volume is put to more profitable use. Advantageously, the storage proper is integrated in a semiconductor device, particularly a single chip microcomputer and is also a read-only memory or a programmable read-only memory, the fixed read-setting of which is posted during assembly in association to the heater concerned, for example, through permanent wiring or soldering of loose ends or printed circuit board to ground or a predetermined voltage level so as to achieve a binary code which indicates, in coded form, the heater concerned.

The control with the aid of the selected and fixedly set control program permits control procedures to achieve maximal optimization of the efficiency through the steps of processing disturbance variables such as data relating to flame analysis, dynamic exhaust analysis, the temperature and pressure of the inducted combustion air, and the mass flow rates of the combustion air and fuel. This is particularly desirable when continuous heating power control is involved, for example, through the introduction of a flow rate control on fuel and combustion-air pumps or blowers, in which particular advantages are achieved with respect to noise reduction, saving of electrical energy and fuel, and a more uniform temperature stabilization. To maintain an optimum air-fuel mixture under all loads, the measured values of the exhaust or flame analysis, of a direct or indirect measurement of the mass flow rate of the combustion air and of the fuel, etc. are also processed in a prespecified weighting for the control. The vehicle supply voltage is also processed as a disturbance variable. This disturbance variable is utilized to compensate for unsatisfactory values of the ratio between fuel and combustion air (hereinafter referred to as $\lambda$), because when the rotational speed of the combustion air blower drops when the supply voltage is low, a smaller amount of combustion air is conveyed. Without appropriate countermeasures, an unwanted change of $\lambda$ will occur. By contrast, in the present invention, when the supply voltage drops, the fuel supply can be automatically throttled e.g. by reducing the clock frequency of the fuel pump in such a way that $\lambda$ remains constant. This is further of advantage in that, the heater, consumes a lower amount of electrical power for its operation which power, during the preheating, is generally taken from the battery only. Under certain conditions, the battery could be discharged exhaustively. The controller embodying the invention may be designed in such a way that it checks the load condition of the battery and turns the heater off whenever engine startup is just barely possible.

The programming may also be carried out such that when the battery voltage drops, one switches over to a residual heating. The monitoring of the battery capacity may, for example, be done in such a way that the user initially puts the battery capacity into the controller and that, whilst a specified load e.g. one of the outputs of power section 30 is switched on, i.e. connected to the battery, the microcomputer, monitors the supply voltage being applied at that instant. Instead of monitoring the threshold in this manner with a load which is proportional to the battery capacity, the circuit may also be so designed that the microcomputer differentiates the variation of the supply voltage with time, determines therefrom the discharge curve of the battery as a function of the battery capacity put in initially, and sees to it that the heater is turned off when a preset threshold value is too low.

In order to facilitate repairs, the indicating and control panel 14 which is coupled to the controller 10 may include indicator lights which may be used for reporting faults, e.g., when the light goes out, a general fault is indicated, while a flashing light indicates overheating. Further, the controller 10 can include a connection capability to an external documentation device which permits rapid diagnosis even of faults in the controller or in the heating system.

In order to provide timing pulses for operation of the system, an oscillator 34 is provided, to produce an output signal which can be dynamically frequency divided to activate the power section 30 to drive the fuel pump. The oscillator 34, preferably a quartz oscillator, is coupled into the controller 10 through the sequence programmer 20, and produces a clock frequency from which, all other pulses and control times for the controller likewise are derived (including, for example, the safety time, the preglow time and after-running time). Further, the oscillator frequency and/or the dynamic division can be determined under program control through coding, environmental influences, and operating conditions. For example, the coding can appropriately determine a fundamental frequency and, thereby, fix the power range of the heater, while environmental influences, such as air pressure, supply voltage and ambient temperature, as well as operating conditions, particularly the combustion conditions, can vary the fundamental frequency in accordance with a fixed program, e.g., of a weighting table. Furthermore oscillator 34 preferably may control a time switch 36. By program control, the accuracy of all the times derived from oscillator 34 can be digitally adjusted by the user. For example, by varying the division ratio himself, the user can easily adjust within certain limits the accuracy of movement of a time switch 36 activated by the oscillator 34 and the accuracy of the timing of the pulses derived, as well as of the control times, during the service life of the controller, e.g., the user may switch to a calibration mode, in which the display of the time switch 36 indicates predetermined code numbers representing certain clock rate variations of time switch 36, and the user may vary these code numbers by the set keys of the time switch to thereby compensate for clock rate differences within 24 hours. In this way, a high precision throughout the service life can be achieved with relatively high component tolerances. Such time switches 36 however without the aforementioned calibration mode, are known for use in heating systems, as described in U.S. patent application Ser. No. 279,599, entitled "Process and Apparatus for Determination and Utilization of a Quantity of Preheating Energy" filed by Falk Lamkewitz and Josef Riedmaier on July 1, 1981 and assigned to the same assignee as the present invention. Another advantage is that for mass production wide-tolerance and, thus, reasonably-priced components can be used. Because of the transfer of the time-switch function to the controller 10 in this manner, the number of wire cables between controller and control panel can be reduced to two, which is very advantageous with respect to installation weight and technical effort of mounting.

Numerous other refinements are also possible with the aid of the program control, e.g., the capability of assigning priority to engine heating or internal-space heating. Advantageously, an electromagnetically operated valve is provided for the switchover between these two options in accordance with control signals from the controller 10. Also, for the preheating of a vehicle the required preheating time can be placed into storage prior to commissioning as a function of the initial temperature and, when the preheating is to be called upon, the departure time can be programmed to control the start of the preheating time, whereupon the preheating starts automatically at the appropriate time.

At the main component of the controller 10 of FIG. 2 a microcomputer such as an INTEL 8021 or a Motorola 6805 is suitable. The microcomputer comprises the sequence programmer 20, the measured variable selector 18, the fault analysis and report unit 32, the storage 22 for program portions and parameters, the program and parameter selector 24 and the decoding units 26 and 28. The measured variable conditioner 25 and the time switch 36 likewise may be defined by the microcomputer. As an alternative, the unit 26 may be a separate unit including operational amplifiers. The power unit 30 can be comprised of a separate unit which generally will comprise relays and driver transistors for responding to produce output signals in accordance with commands from the sequence programmer 20 in a known manner. The oscillator 34 and the time switch 36 likewise may be external to the microcomputer and are readily available to those familiar with this field of technology.

It is to be understood that the above-described arrangements are simply illustrative of the application of the principles of this invention. Numerous other arrangements may be readily devised by those skilled in the art which embody the principles of the invention and fall within its spirit and scope.

I claim:

1. A controller for controlling the operation of a heater comprising:
    means for storing a plurality of control and regulation programs for the operation of a plurality of different heaters, wherein said storage means includes various preselectable parameters for running of said stored programs;
    means for selecting one of said plurality of control and regulation programs for a particular heater from among said plurality of different heaters in accordance with selection instructions identifying said particular heater;
    means for providing control and regulation signals to said particular heater in accordance with the selected control and regulation program; and
    means for receiving disturbance variables indicative of heater operation and environmental conditions pertaining to heater operation;
    wherein said means for providing control and regulation signals includes a programmer for receiving said disturbance variables and providing said control and regulation signals in accordance with said disturbance variables and said selected program, wherein said heater is a vehicle heater and wherein a vehicle supply voltage is input to said programmer as a disturbance variable, said means for providing control and regulation signals providing such signals to preheat said vehicle prior to starting an engine of said vehicle.

2. The controller as set forth in claim 1, wherein said programs are stored in the form of separate program parts which are selectable in various combinations by said selecting.

3. The controller as set forth in claim 2, wherein said storage means is integrated in a semiconductor device in conjunction with a microcomputer.

4. The controller as set forth in claim 3, wherein said storage means is a read-only memory or a programmable read-only memory.

5. The controller as set forth in claim 4, wherein the selection of programs and parameters is done by a permanently adjustable read-addressing.

6. The controller as set forth in claim 1 wherein said disturbance variables include data relating to a flame analysis, a dynamic exhaust analysis, the temperature of inducted combustion air, the pressure of said inducted combustion air, and/or the mass flow rates of combustion air and fuel, for which, in electrically code form, the controller has feed-in terminals.

7. The controller as set forth in claim 1 or 6, further comprising a monitoring stage coupled to said programmer for the vehicle battery capacity, by means of which the heater can be switched off when the residual capacitance of said battery is sufficient for starting the engine but is too low for preheating the vehicle and starting the vehicle engine.

8. The controller as set forth in claim 1 or 6, further comprising an indicating device coupled to said means for receiving disturbance variables on which information is presented upon signal entry of said disturbance variables in a specified range of values.

9. The controller as set forth in claim 1 or 6, further comprising means for connecting said controller to an external documentation device which indicates the values of the disturbance variables received and carries out an error-analysis program with regard to said disturbance variables.

10. The controller as set forth in claim 1 or 6, further comprising a power stage in said means for providing control and regulation signals and an oscillator, the output signal of which oscillator activates the power stage following a division of its oscillation frequency, said power stage generating drive pulses for a fuel pump coupled to said power stage.

11. A controller for controlling the operation of a heater comprising:
   means for storing a plurality of control and regulation programs for the operation of a plurality of different heaters, wherein said storage means includes various preselectable parameters for running of said stored programs;
   means for selecting one of said plurality of control and regulation programs for a particular heater from among said plurality of different heaters in accordance with selection instructions identifying said particular heater;
   means for providing control and regulation signals to said particular heater in accordance with the selected control and regulation program, said means for providing control and regulation signals including a power stage;
   means for receiving disturbance variables indicative of heater operation and environmental conditions pertaining to heater operation;
   wherein said means for providing control and regulation signals includes a programmer for receiving said disturbance variables and providing said control and regulation signals in accordance with said disturbance variables and said selected program; and
   an oscillator, the output signal of which oscillator activates the power stage following a division of its oscillation frequency, said power stage generating drive pulses for a fuel pump coupled to said power stage.

12. The controller as set forth in claim 11, wherein the oscillator frequency and/or the division are adjustable under program control.

13. The controller as set forth in claim 11, wherein the output frequency of said oscillator and/or the ratio of its frequency division is adjustable under software program control by the user.

14. The controller as set forth in claim 1, wherein said means for receiving said disturbance variables includes threshold means for determining whether said disturbance variables are above or below predetermined thresholds.

15. The controller as set forth in claim 7, wherein said means for providing control and regulation signals includes means for reducing a flow of fuel to said heater if said supply voltage drops below a predetermined level to maintain a constant ratio of fuel to combustion air in spite of said drop in supply voltage.

16. The controller as set forth in claim 1, wherein said selecting means includes decoders for receiving coded input signals indicative of a selected one of said plurality of heaters.

* * * * *